(12) United States Patent
Maguin

(10) Patent No.: US 11,471,799 B2
(45) Date of Patent: Oct. 18, 2022

(54) DEVICE FOR FILTERING LIQUID DRAWN IN BETWEEN TWO SUPERIMPOSED LAYERS OF FILTERING MEDIA

(71) Applicant: VITESCO TECHNOLOGIES GMBH, Hanover (DE)

(72) Inventor: Georges Maguin, Toulouse (FR)

(73) Assignee: VITESCO TECHNOLOGIES GMBH, Hanover (DE)

( * ) Notice: Subject to any disclaimer, the term of this patent is extended or adjusted under 35 U.S.C. 154(b) by 0 days.

(21) Appl. No.: 17/256,470

(22) PCT Filed: Jun. 24, 2019

(86) PCT No.: PCT/EP2019/066603
§ 371 (c)(1),
(2) Date: Dec. 28, 2020

(87) PCT Pub. No.: WO2020/002194
PCT Pub. Date: Jan. 2, 2020

(65) Prior Publication Data
US 2021/0129052 A1   May 6, 2021

(30) Foreign Application Priority Data
Jun. 29, 2018   (FR) ...................... 1855940

(51) Int. Cl.
*B01D 35/027*     (2006.01)
*B01D 29/54*      (2006.01)
(Continued)

(52) U.S. Cl.
CPC ......... *B01D 35/0273* (2013.01); *B01D 29/54* (2013.01); *B01D 35/18* (2013.01);
(Continued)

(58) Field of Classification Search
CPC combination set(s) only.
See application file for complete search history.

(56) References Cited

U.S. PATENT DOCUMENTS 5,116,506 A * 5/1992 Williamson ........... C12M 23/34
                                                    210/610
5,902,480 A   5/1999 Chilton et al.
(Continued)

FOREIGN PATENT DOCUMENTS

| CN | 103573493 A | 2/2014 |
| CN | 105792909 A | 7/2016 |
| DE | 10 2013 113 155 | 5/2015 |

OTHER PUBLICATIONS

International Search Report and Written Opinion of the ISA for PCT/EP2019/066603 dated Sep. 9, 2019, 12 pages.
(Continued)

*Primary Examiner* — Binh Q Tran
(74) *Attorney, Agent, or Firm* — Nixon & Vanderhye

(57) ABSTRACT

Disclosed is a filtration device for a liquid, including: at least two superimposed layers of filter media having weld lines creating strips between them, the layers of filter media having weld lines being superimposed such that the weld lines of one layer form, with the weld lines of the other layer, a mesh structure when viewed at an angle normal to the layers of filter media; a first external face and a second external face each being produced at least locally from a water-permeable material, the layers of filter media being positioned between the external faces; and an intake connector used for drawing liquid in through the filtration device.

20 Claims, 2 Drawing Sheets

(51) Int. Cl.
*B01D 35/18* (2006.01)
*F01N 3/20* (2006.01)

(52) U.S. Cl.
CPC ........ *F01N 3/2066* (2013.01); *F01N 2610/02* (2013.01); *F01N 2610/1406* (2013.01); *F01N 2610/1426* (2013.01)

(56) References Cited

U.S. PATENT DOCUMENTS

| | | | |
|---|---|---|---|
| 7,344,642 B2* | 3/2008 | Patton | A01N 25/10 210/209 |
| 9,587,544 B2* | 3/2017 | Maguin | F01N 3/2066 |
| 9,962,636 B2 | 5/2018 | Hibi et al. | |
| 10,253,738 B2* | 4/2019 | Da Costa | F02M 37/26 |
| 10,392,995 B2 | 8/2019 | Maguin | |
| 2008/0152430 A1* | 6/2008 | Flor | B01J 20/267 405/45 |
| 2014/0042079 A1 | 2/2014 | Hibi et al. | |
| 2015/0217232 A1* | 8/2015 | MacCallum | C02F 1/447 210/321.64 |
| 2017/0087488 A1* | 3/2017 | Maguin | B01D 35/0273 |

OTHER PUBLICATIONS

Office Action issued in Chinese Patent Application No. 201980043621.9 dated Nov. 26, 2021.

\* cited by examiner

DEVICE FOR FILTERING LIQUID DRAWN IN BETWEEN TWO SUPERIMPOSED LAYERS OF FILTERING MEDIA

This application is the U.S. national phase of International Application No. PCT/EP2019/066603 filed Jun. 24, 2019 which designated the U.S. and claims priority to FR Patent Application No. 1855940 filed Jun. 29, 2018, the entire contents of each of which are hereby incorporated by reference.

BACKGROUND OF THE INVENTION

Field of the Invention

The present invention relates to a filtration device for a liquid. This device is more particularly intended for purifying an additive used in an internal combustion engine for limiting the pollutant emissions of this engine.

Description of the Related Art

For around twenty years, certain vehicles propelled by an internal combustion engine have been equipped with a tank intended to be filled with a solution containing urea. The solution used is known by the reference AUS32. It is an aqueous solution of urea in a 32.5% dilution. This urea, converted to ammonia, is then used in a catalytic converter to perform dive catalytic reduction (known by its English abbreviation SCR). The ammonia then makes it possible to reduce components of the NOx type present in the exhaust gases into nitrogen and water.

Before being used, the solution of AUS32 type needs to be filtered to ensure that it does not contain impurities which might enter the tank for example while the latter is being filled. This is because certain impurities are liable to foul the catalytic converter and thus reduce its efficiency.

Document DE102013113155 discloses a multilayer liquid-purification element having a liquid-permeable upper layer and having a liquid-impermeable base layer, the base layer comprising an intake connector for drawing liquid in through the liquid-purification element, and at least the upper layer and the base layer are connected to one another by means of a liquid-impermeable connection, there being at least one distinct insert between the upper layer and the base layer.

The solution proposed in that document provides good purification of the liquid lying inside a tank and pumped in order to supply it to a catalytic converter or similar.

SUMMARY OF THE INVENTION

It is an object of the present invention to optimize a filtering device of the prior art. Such a device will not be limited to filtering a solution of AUS32 type but may also relate to a liquid used in a system for metering and injecting a liquid, such as water for example in the case of water being injected into a so-called gasoline engine.

It is a more particular object of the present invention to limit the size of the filter for the same filtration capacity.

Another object of the present invention is to limit the cost price of the filter.

To this end, the present invention proposes a filtration device for a liquid, comprising at least two superimposed layers of filter media positioned between a first external face and a second external face, and an intake connector used for drawing liquid in through the filtration device.

According to the present invention, the first external face and the second external face are each produced at least locally from a water-permeable material; said at least two layers of filter media respectively have weld lines creating strips between them, and said at least two layers of filter media respectively having weld lines superimposed such that the weld lines of one layer form, with the weld lines of the other layer, a mesh structure when viewed at an angle normal to the layers of filter media.

This structure makes it possible to have a filtration device of reduced surface area and also reduced thickness because it allows filtration to be performed from two opposite faces of the device. Furthermore, the weld lines produced give the assembly some rigidity, thus making it self-supporting. Regarding the weld lines, these can be produced for example before the two faces of the filter are obtained by folding a sheet of filter media. A meshed network of ducts constituting a drainage network is thus created, distributing the flow of liquid optimally, with an optimized passage cross section available on the surface of the filtering element. A weld line locally produces a compression of the filter media (by reducing the thickness to the thickness of the filtration material without the porosities, and therefore by locally increasing the density of the filtering element, thus freeing up the cross section for passage of the liquid.

In such a filtration device, the first external face and/or the second external face are preferably produced entirely from a water-permeable material so as to promote access of the liquid that is to be filtered to the layers of filter media.

In order to facilitate manufacture of the filtration device, it is proposed that the first external face, the second external face, and the two layers of filter media have substantially the same contour, and that these elements be connected to one another by a peripheral weld. Here again, the two layers of filter media may be obtained by folding the one same filter sheet.

In order to ensure good sealing, the intake connector is advantageously welded both to the first external face and to one layer of filter media. This intake connector is then preferably positioned near an edge of the first external face, and the weld lines for the layer of filter media welded to the connector are oriented substantially perpendicularly with respect to said edge so as to optimize the flows of liquid in the filtration device.

For better circulation of the filtered liquid, the weld lines are advantageously substantially parallel to one edge of the layer of filter media.

The weld lines of one layer of filter media preferably extend in a direction substantially perpendicular to the weld lines of the other layer of filter media in order to make the circulation of the liquid more uniform and distribute this liquid correctly with respect to the filter media.

The present invention also relates to a tank having an outlet orifice, characterized in that it further comprises a filtration device as described hereinabove, and in that said outlet orifice collaborates with the intake connector of the filtration device. The outlet orifice may be produced in a wall of the tank or else of a support that sits inside the tank to accept the filtration device. This support may for example be a wall of a housing made inside the tank to accommodate a pump for drawing the liquid out of the tank.

In the case of such a tank, the outlet orifice is preferably produced on a wall that is at least partially grooved, and the filtration device is positioned facing a grooved part of said wall. In this way, the liquid from the tank can always access both faces of the filtration device. Furthermore, the grooving encourages exchanges of heat between the support and the filtration device. Thus, in the event of freezing, improved heat exchanges during thawing allow uniform and more rapid thawing.

To facilitate the thawing of the liquid in the tank, the outlet orifice is made on a wall which for example comprises heating means, such as a resistive electrical element (or other means).

BRIEF DESCRIPTION OF THE DRAWINGS

Details and advantages of the present invention will become more clearly apparent from the description that follows, supported by the appended schematic drawing in which.

DESCRIPTION OF THE PREFERRED EMBODIMENTS

Figure 1:
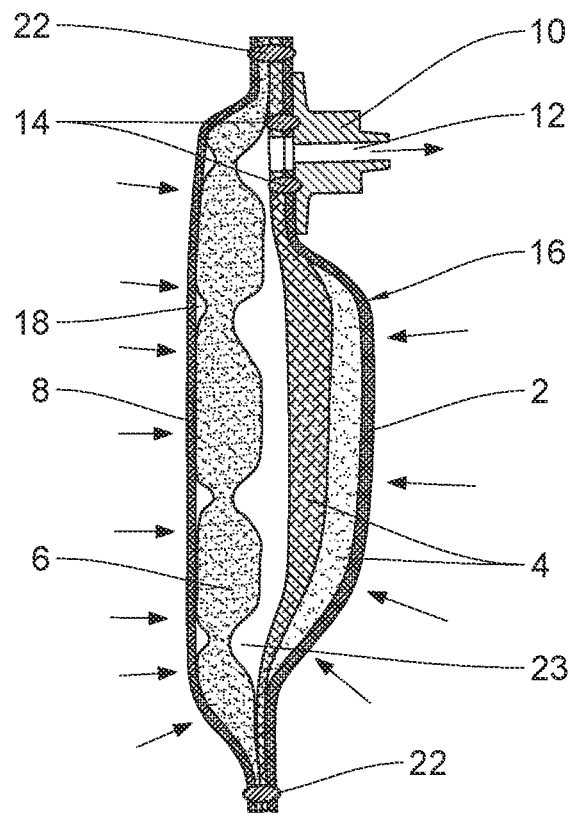
FIG. 1 illustrates, in longitudinal section, a tank filter.

In FIG. 1, the view in longitudinal section of a filtration device reveals a first exterior face 2, a first filtering layer 4, a second filtering layer 6, a second exterior face 8 and an intake connector 10.

The filtration device illustrated here is intended for example to sit in an additive tank in a motor vehicle. More specifically, it is for example a filter for a solution of urea, known by the designation AUS32 or else by the registered trade name ADBLUE. The intake connector 10 of the filtration device may therefore be mounted on the outlet orifice of this tank in such a way that all the liquid leaving the tank passes through said filtration device.

In a novel manner, the filtration device proposed here is produced in the form of a stack of four filtering layers welded together around their periphery.

In general, in the present description, the welds may be produced for example by ultrasonic welding, using the width of a sonotrode-anvil assembly to define the width of the wall thus created. The use of such an ultrasonic welding process is known and used for welding together the layers of a filter.

The first exterior face 2 and the second exterior face 8 are made from a water-permeable material. This material is, for example, a perforated sheet or else a flexible mesh. These exterior faces may also comprise a polymer material, but a metallic material can also be employed here. The chief functions of these exterior faces are, on the one hand, to protect the filtering layers inside the filtration device and, on the other hand, to allow the liquid lying inside the tank to access these filtering layers easily.

The first filtering layer 4 and the second filtering layer 6 are preferably of the same nature. This is, for example, in the case of each of these layers, a collection of nonwoven fibers, for example made from a synthetic polymer material. These filtering layers preferably form deep-bed filters which make it possible to separate impurities from the liquid within the filtering layer and do not act as a screen which holds back the impurities on its surface such that the impurities amass at the surface of the screen. The fibers used may be arranged in the filter layer chaotically or in an ordered manner. It is thus possible for example to have a woven arrangement. In another variant, fibers may be spun and sprayed onto a substrate.

The material used for creating the first filtering layer 4 and the second filtering layer 6 is preferably a material that can be readily welded.

The first exterior face 2 and the first filtering layer 4 bear the intake connector 10. The latter takes the form of a tubular component with a central passage 12 situated inside a sleeve of a shape suited to an outlet orifice of a tank on which the intake connector 10 needs to be mounted. In the embodiment illustrated in the drawing by way of purely illustrative and nonlimiting example, the sleeve at one of its ends has a flange that comes to bear against the first exterior face 2 and at its other end has a region of reduced external diameter.

The first exterior face 2 and the first filtering layer 4 each have a passage aligned with the central passage 12 of the sleeve. A first weld 14 is produced all around these passages to connect together, in a sealed manner, the sleeve at the side of the flange thereof, the first exterior face 2 and the first filtering layer 4. By comparison with FIG. 1, an embodiment variant could be for the flange of the intake connector 10 to be sandwiched between the first exterior face 2 and the first filtering layer 4 or else inside the filtration device, between the first filtering layer 4 (being attached thereto) and the second filtering layer 6. Welding the intake connector 10 to the first filtering layer 4 is not necessary, but is preferred.

In a novel manner, second welds 16 are made on the first filtering layer 4. The purpose of these second welds 16 is to create lines along which the thickness of the first filtering layer 4 is reduced by comparison with the "original" thickness of the first filtering layer 4.

Figure 2A:
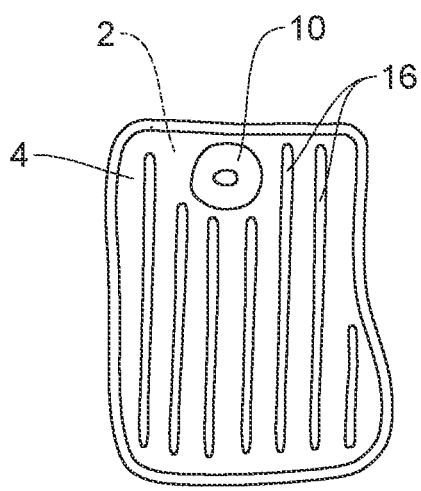
FIGS. 2A to 2C respectively illustrate a filtering layer of the filter of FIG. 1, another filtering layer of this filter and the two filtering layers of FIGS. 2A and 2B assembled.

FIG. 2A illustrates, in a view from above, the first exterior face 2 with the intake connector 10. The overall shape of this first exterior face 2 is rectangular. It has two long edges or longitudinal edges, and two short edges or transverse edges.

The intake connector 10 is situated near a transverse edge of the first exterior face 2. It is assumed that this is the upper edge of this first exterior face 2. This is because, for better filtration, as is known by those skilled in the art, it is preferable to lengthen the path followed by the liquid through the filter media through which it passes. It is therefore preferable to have the intake in the upper part of the filtration device. Provision is thus made for the intake connector 10 to be situated in the upper quarter of the first exterior face 2 and, as a preference, as close as possible to the upper edge of the first exterior face 2.

The second welds 16 form lines which preferably do not intersect. They are preferably parallel, and more preferably still, substantially rectilinear. These weld lines extend over the majority of the length of the length (height) of the first exterior face. In the case of second weld lines 16 extending parallel to the longitudinal edges of the first exterior face 2 of rectangular overall shape, provision may for example be made for these second weld lines 16 to extend over at least two thirds of the length of these longitudinal edges, preferably over at least 80% of this length.

In the case of a face of non-rectangular shape, provision could be made for at least certain weld lines to have a length corresponding to at least two thirds of an overall dimension of this exterior face.

FIG. 2A illustrates an exterior face that accepts the intake connector 10. On this exterior face, the intake connector 10 is situated near an edge of this face and the second weld lines 16 then preferably extend substantially perpendicular to the edge along which the intake connector 10 is positioned, thus forming channels that allow filtered liquid to approach this intake connector 10.

The second filtering layer 6 likewise has weld lines. The welds in the form of lines (which are not necessarily rectilinear but preferably are rectilinear) will be referred to hereinafter as third welds 18.

Figure 2B:
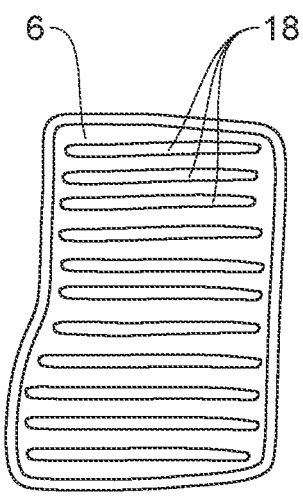

The shape of this second filtering layer 6 is the same as that of the first filtering layer 4, these two filtering layers being intended to be superimposed one on the other. They are depicted in FIGS. 2A and 2B facing one another, and therefore exhibit axial symmetry.

Figure 2C:
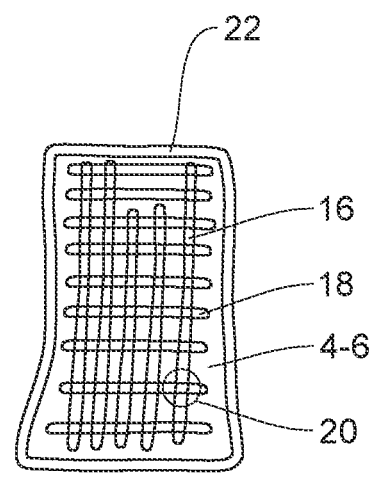

The third welds 18 on the second filtering layer 6 are positioned in such a way that when the second filtering layer 6 is superimposed on the first filtering layer 4, then the third welds 18 create, with the second welds 16, a network with intersections 20 as illustrated in FIG. 2C.

Thus, the third weld lines 18 can be found on the second filtering layer 6. As explained with reference to the first filtering layer 4, these weld lines preferably do not Intersect, more preferably are mutually parallel, and advantageously parallel to one edge of the second filtering layer 6. Here, because the second weld lines 16 on the first filtering layer 4 are parallel to the longitudinal edges of the first filtering layer 4, in a preferred (nonlimiting) embodiment, third weld lines 18 here are parallel to the transverse edges of the second filtering layer 6. These weld lines preferably extend over the majority of the width of the second filtering layer 6, preferably over at least two thirds of this width, and more preferably over at least 80% of this width.

FIG. 2C illustrates the first filtering layer 4 superimposed on the second filtering layer 6 in a view from above, showing the weld lines of these two filtering layers. Here we have a network of perpendicular weld lines.

FIG. 2C also shows a fourth weld 22 made at the periphery of the first filtering layer 4 superimposed on the second filtering layer 6. As can be seen in FIG. 1, which illustrates a preferred embodiment, this fourth weld 22 also advantageously assembles the first exterior face 2 and the second exterior face 8. The quality of this fourth weld 22 is high. This weld is preferably liquidtight. If it is not, then it needs to have at least as good a "performance" as the filtering layers, which means to say that this fourth weld 22 must not allow through it an impurity that would be filtered out by one or other of the first filtering layer 4 or the second filtering layer 6. It is possible to test this weld using methods known to those skilled in the art and which allow the location of the largest-sized passage in a filtering assembly to be defined.

What is thus produced is a composite filtration device comprising several layers that are superimposed on and fixed to one another. The exterior faces have the function of protecting the filtering layers and of supplying them with liquid that is to be filtered. The filtering layers for their part filter the liquid and guide it toward the intake connector 10. Thanks to the network of second welds 16 and third welds 18 and to the intersections 20 between these welds, a buffer cavity 23 is created between the first filtering layer 4 and the second filtering layer 6. This network also makes it possible to make the filtration device more rigid as the welds on the filtering layers form something akin to a framework within this device.

Figure 3:
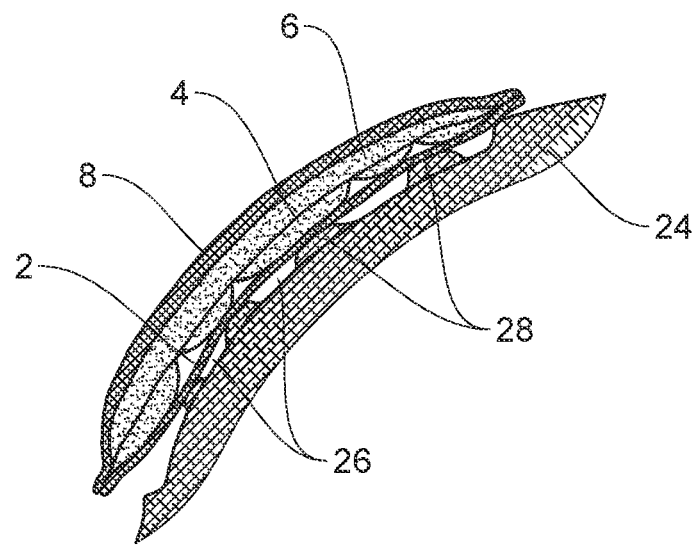
FIG. 3 is a schematic view in transverse section of the filter of FIG. 1 in place on a support.
Figure 4:
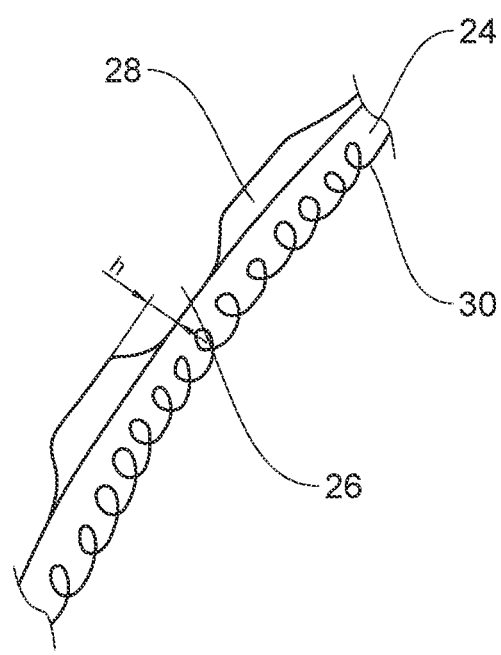
FIG. 4 is a schematic detail view, on a larger scale, of the support of FIG. 3.

The filtration device described hereinabove can sit on a support 24. The appended FIG. 3 illustrates this support 24 only in part. For an illustration of this support, reference is made to FIG. 4 of document DE102013113155A1. In that prior-art document, FIG. 4 shows a filtration device (reference 1 in that figure, corresponding to "Flüssigkeitsreinigungselement") on a support (corresponding to the housing—Gehäuse—16 in document DE '155) placed inside an additive tank. This present support 24 may, as illustrated in that prior-art document, act as a housing for a pump which supplies for example an injector of an engine exhaust gas treatment device (see FIG. 5 of DE '155).

By comparison with the support of the prior art, it is proposed here that the surface of the support 24 that accepts the filtration device be grooved (or ribbed). What that means here is that the surface has channels 26 allowing for a circulation of the liquid lying inside the tank along the face of the filtration device (the first exterior face 2) that lies against the support 24. The first exterior face 2 of the filtration device therefore comes so rest against support ribs 28 which separate the channels 26 made at the surface of the support 24. The liquid can therefore, via the channels 26, access the first exterior face 2 and enter the filtration device.

FIG. 4 illustrates, on a larger scale, a detail of the surface of the support 24 of FIG. 3. This figure illustrates the height h of the support ribs 28 (which also corresponds to the depth of the channels 26) between the top of a support rib 28 and the bottom of an adjacent channel 26. This height h is advantageously less than 2 mm, preferably of the order of a few tenths of a millimeter, for example between 0.25 and 0.75 mm.

The exterior surface of the support 24, facing the filtration device, is preferably heated, for example using a resistive electrical element 30 illustrated schematically in FIG. 4. In this embodiment variant, the support ribs 28 improve the exchange of heat by natural convection between the support 24 and she filtration device. In the event of freezing, the first exterior face 2 thaws more quickly thanks to the better exchange of heat between the support 24 and, on the one hand, the liquid in the channels 26 and, on the other hand, the filtration device and more particularly the first exterior face 2 thereof. It will also be noted that the shape of the filtering layers inside the filtration device, thanks to the presence of the weld lines, is also ribbed and this shape encourages good exchange of heat in the filtration device, notably as far as the thawing of the liquid that is to be filtered is concerned.

As is evident from the above description, the proposed filtration device allows a liquid to be filtered from two opposite faces. The bulkiness (in terms of surface area) of the filtration device is thus practically halved for equivalent performance.

The number of elements in the manufacture of the filtration device is limited. There are the filtering layers, the exterior wrapper and the intake connector. It should be pointed out that structures other than that of the preferred embodiment illustrated particularly in the drawing can be envisioned. Thus, by way of example, the protective wrapper could surround the filter media without being attached to this media (or to the connector). Depending on the desired filtration, or also depending on the nature of the filtering layers, there might for example be more than two filtering layers. For example, each filtering layer illustrated in the drawing could be lined with another layer which would sit between it and the corresponding exterior face. These additional filtering layers do not necessarily have weld lines. They may be of the same nature as the filtering layers with weld lines, or of a different nature.

The grooving of the support of the filtration device is advantageous on two counts, for the supply of liquid and for exchanges of heat, but is optional. By siting the filtration device on a concave surface for example, it is possible to supply it with liquid on its two opposite faces, because its rigidity may be sufficient for it not to conform to the shape of its support.

The proposed structure for the filtration device allows the liquid to drain through the entire filtering surface.

The filtration device described hereinabove is particularly well suited to filtering a liquid of AUS32 type, but may find other applications, for example in filtering water. In the case of filtration of liquid of AUS32 type, it is possible using such a filtration device to separate from the liquid of AUS32 type both the air that it contains and potential traces of fuel. Depending in particular on the nature of the material used for the exterior faces, and also on the position of the filter in the tank, it is possible through capillary action to draw up the last few drops of liquid present in the tank.

In comparison with the equivalent devices of the prior art, a filtration device according to the present invention has a reduced overall volume and a reduced mass. All of this is advantageous from a logistical perspective and allows both manufacturing and transport costs to be reduced. Furthermore, it is simpler to fit. Specifically, because of its reduced size, economies can be made on the fixing devices.

Of course, the present invention is not limited to the embodiments described and to the variants mentioned. It also relates to the variant embodiments within the competence of the person skilled in the art.

The invention claimed is:

1. A filtration device for a liquid, the filtration device comprising:
    a first external layer formed of a water-permeable material;
    a second external layer formed of a water-permeable material;
    at least two superimposed layers of filter media positioned between the first external layer and the second external layer, said at least two superimposed layers of filter media respectively having weld lines creating strips, the weld lines of one of the superimposed layers forming, with the weld lines of another one of the superimposed layers, a mesh structure when viewed at an angle normal to the superimposed layers of filter media; and
    an intake connector configured to draw liquid in through the filtration device, the first exterior layer and one of the superimposed layers bearing the intake connector.

2. The filtration device as claimed in claim 1, wherein one or more of the first external layer and the second external layer are entirely formed of the respective water-permeable material.

3. The filtration device as claimed in claim 1, wherein the first external layer the second external layer, and the at least two superimposed layers of filter media have substantially the same contour and are connected to one another by a peripheral weld.

4. The filtration device as claimed in claim 1, wherein the intake connector is welded to the first external layer and the one of the superimposed layers of filter media.

5. The filtration device as claimed in claim 4, wherein the intake connector is positioned near an edge of the first external layer, and
wherein the weld lines for the superimposed layer of filter media welded to the connector are oriented substantially perpendicularly with respect to said edge.

6. The filtration device as claimed in claim 1, wherein the weld lines are substantially parallel to one edge of the respective superimposed layer of filter media.

7. The filtration device as claimed in claim 1, wherein the weld lines of one of the superimposed layers of filter media extend in a direction substantially perpendicular to the weld lines of another layer of the superimposed layers of filter media.

8. A tank having an outlet orifice, the tank comprising:
    the filtration device as claimed in claim 1, said outlet orifice collaborating with the intake connector of the filtration device.

9. The tank as claimed in claim 8, wherein the outlet orifice is produced on a wall that is at least partially grooved, and
    wherein the filtration device is positioned facing a grooved part of said wall.

10. The tank as claimed in claim 8, wherein the outlet orifice is made on a wall which comprises a heater.

11. The filtration device as claimed in claim 2, wherein the first external layer, the second external layer, and the at least two superimposed layers of filter media have substantially the same contour and are connected to one another by a peripheral weld.

12. The filtration device as claimed in claim 2, wherein the intake connector is welded to the first external layer and the one of the superimposed layers of filter media.

13. The filtration device as claimed in claim 3, wherein the intake connector is welded to the first external layer and the one of the superimposed layers of filter media.

14. The filtration device as claimed in claim 2, wherein the weld lines are substantially parallel to one edge of the respective superimposed layer of filter media.

15. The filtration device as claimed in claim 3, wherein the weld lines are substantially parallel to one edge of the respective superimposed layer of filter media.

16. The filtration device as claimed in claim 4, wherein the weld lines are substantially parallel to one edge of the respective superimposed layer of filter media.

17. The filtration device as claimed in claim 5, wherein the weld lines are substantially parallel to one edge of the respective superimposed layer of filter media.

18. The filtration device as claimed in claim 2, wherein the weld lines of one of the superimposed layers of filter media extend in a direction substantially perpendicular to the weld lines of another layer of the superimposed layers of filter media.

19. The filtration device as claimed in claim 3, wherein the weld lines of one of the superimposed layers of filter media extend in a direction substantially perpendicular to the weld lines of another layer of the superimposed layers of filter media.

20. The filtration device as claimed in claim 4, wherein the weld lines of one of the superimposed layers of filter media extend in a direction substantially perpendicular to the weld lines of another layer of the superimposed layers of filter media.

* * * * *